United States Patent [19]

Schlichte

[11] 4,045,617

[45] Aug. 30, 1977

[54] TELECOMMUNICATION SWITCHING NETWORK HAVING A MULTISTAGE REVERSED TRUNKING ARRANGEMENT

[75] Inventor: Max Schlichte, Munich, Germany

[73] Assignee: Siemens Aktiengesellschaft, Munich, Germany

[21] Appl. No.: 630,639

[22] Filed: Nov. 10, 1975

[30] Foreign Application Priority Data

Nov. 14, 1974 Germany ............................ 2454090

[51] Int. Cl.[2] ............................................ H04J 3/00

[52] U.S. Cl. ............................................ 179/15 AT

[58] Field of Search ...................... 179/15 AT, 15 AQ

[56] References Cited

U.S. PATENT DOCUMENTS 3,878,338 4/1975 Hardy ............................ 179/15 AT 3,937,895 2/1976 Karl ............................... 179/15 AT

*Primary Examiner*—Thomas W. Brown

*Attorney, Agent, or Firm*—Schuyler, Birch, Swindler, McKie & Beckett

[57] ABSTRACT

A telecommunication switching network having a multistage reversed trunking arrangement and switching on a four wire basis is described. A number of single channel subscriber lines is connectible to a first switching stage. The number of subscriber lines equals the product of $e \cdot v \cdot g$ where $g$ equals the number of groups into which the subscriber lines are divided, $v$ equals the number of subgroups into which each group is divided and $e$ equals the number of terminals in each subgroup, or the number of termination coupling circuits in that group. A time division multiplex trunk having a number $z$ time slots connects each subgroup of termination circuits to a second switching stage. A total of $z \cdot v \cdot g$ connection channels extend between the first and second switching stages. The first switching stage includes conductor cross switching apparatus for error-free switching.

3 Claims, 1 Drawing Figure

KFk SWITCHING NETWORKS
KF2
HOLDING STORAGE
KF1 HS A AS111 B TDM SWITCHING MATRICES C
TERMINATION COUPLING CIRCUITS
ZS Z HS
TDM SWITCHING MATRICES
AL111 AF
CODE PCM REGISTER
AS11e Lab11
AL11e B1 Lbc11 C1
AS1v1
AS1ve Lab1v
AL1ve Lbc1g
ALg11
ASg11 Labg1 Lbcg1
ASg1e
Bg Lbcg1 Cg
ASgv1
ASgve Labgv
ALgve Lbcgg

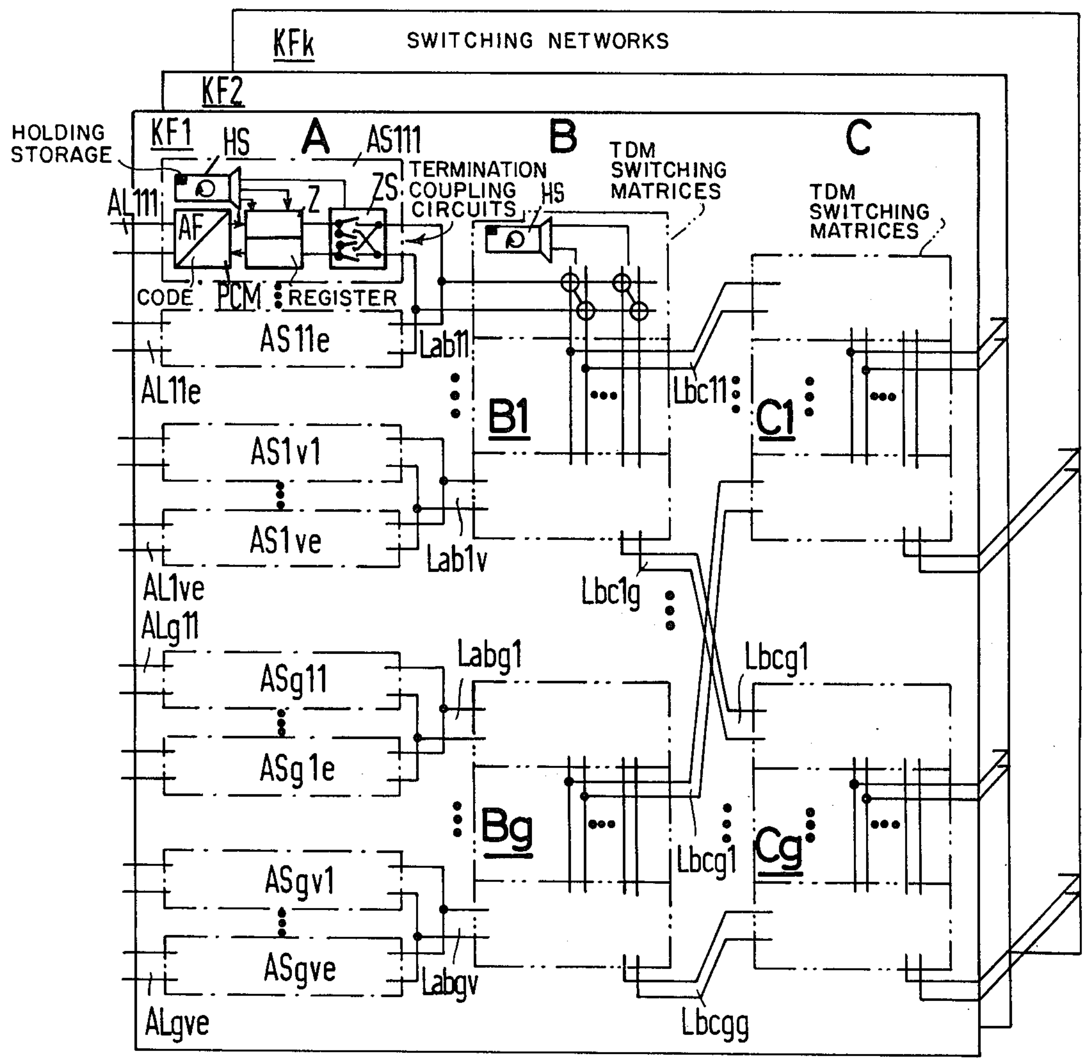
KFk
SWITCHING NETWORKS
KF2
KF1
HOLDING STORAGE
HS
A
AS111
B
C
TERMINATION COUPLING CIRCUITS
ZS
Z
HS
TDM SWITCHING MATRICES
TDM SWITCHING MATRICES
AL111
AF
CODE
PCM
REGISTER
AS11e
Lab11
AL11e
B1
Lbc11
C1
AS1v1
AS1ve
Lab1v
AL1ve
Lbc1g
ALg11
ASg11
Labg1
Lbcg1
ASg1e
Bg
Lbcg1
Cg
ASgv1
ASgve
Labgv
ALgve
Lbcgg

TELECOMMUNICATION SWITCHING NETWORK HAVING A MULTISTAGE REVERSED TRUNKING ARRANGEMENT

BACKGROUND OF THE INVENTION

In centrally controlled telecommunication switching systems, more particularly telephone switching systems, subscriber lines and/or interexchange trunks from or to switching centers are interconnected by switching elements (crosspoints) forming in their entirety a switching network in accordance with the connections needed tor each a given destination. This arrangement of the switching elements within the switching network is likewise referred to as the trunking scheme of the latter. Among the possible trunking schemes of telecommunication switching systems one can distinguish various types. One such type includes switching networks with stage-by-stage call buildup, which are divided into several ranks of selectors and in which during (stage-by-stage) call buildup only the possible paths within the rank of selectors currently being reached are taken into account. Another type includes switching networks with conjugate selection in which for a call buildup the busy/idle status of the entire switching network is taken into account.

In the case of switching networks with conjugate selection a distinction can be made between switching networks having an elongated trunking scheme, in which on two sides of the switching network there are disposed two groups of terminals and connections can be established only between one terminal of one side and one terminal of the other side, and switching networks with reversed trunking scheme, in which all terminals are located on the same side of the switching network. Switching networks using the reversed trunking scheme are disclosed, for example, in Reports on Telephone Engineering VI (1970) ½, published by Siemens A.G., Berlin and Munich, West Germany, pp. 28–33 and 65–73. (cf. British Pat. No. 1,058,893) have the advantage of practically full availability to the outgoing lines, a high flexibility with respect to different conditions of compatibility and a far-reaching modular structure. However, the individual components of prior art space-division switching networks with the reversed trunking scheme and crosspoints formed by dry reed contacts in metal enclosures cannot be made by the increasingly popular large scale integration techniques. Difficulties are encountered, such as the so-called pin limitation, excessive heating, and technological limits which possibly allow one to place, e.g., a matrix with 4 . . . 16 crosspoints on a single component in medium scale integration.

An object of the invention is to provide a switching network having reversed trunking which can be constructed using large scale integration techniques, whereby several hundred switches can easily be placed on a single component.

SUMMARY OF THE INVENTION

According to the principles of the invention, the foregoing and other objects are achieved in a switching network which is characterized in that it is designed as a pulse code modulation (PCM) time division multiplex (TDM) switching network in which a first switching stage is formed by *g* groups, each containing *v* subgroups of *e* termination coupling circuits, which are individually allocated to an audio frequency subscriber line and have a PCM Codec, i.e., an audio frequency to PCM, analog-digital converter, with a PCM work register, and a time slot switch. The termination coupling circuits in a subgroup are connected to a TDM trunk having *z* time slots. Each of the TDM trunks is connected to an input of a TDM switching matrix, associated with the group to which that trunk is connected, of the second switching stage having a number *g* such TDM switching matrices with *v* inputs and *g* outputs each. A third switching stage, likewise, has a number *g* TDM swithcing matrices whose *g* inputs are each connected to an output of each of the *g* TDM switching matrices of the second switching stage.

The invention has the advantage that the switching network can be realized using metal oxide semiconductor (MOS) large scale integration components, while preserving the propitious traffic characteristics of a switching network with a reversed trunking scheme and also its basic control procedures. Thus, a centrally controlled, stored program switching system can always operate with the same program through the PCM time division switching network, while on the other hand all the advantages known for PCM time division switching networks, such as a simpler and more economical crosspoint that needs to operate on digital signals only, and the substantially smaller number of crosspoints per line unit can also be taken advantage of.

The switching network constructed in accordance with the teachings of this invention may in a further development also be a part of a switching network comprising several such switching networks, whereby the individual outputs of each TDM switching matrix of the third switching stage of a switching network are each connected to an output of the corresponding TDM switching matrix of the third switching stage of the remaining individual switching networks.

BRIEF DESCRIPTION OF THE DRAWING

The invention will now be described with reference to the following detailed description and the accompanying drawing and which is a schematic diagram of a preferred embodiment of a switching network according to the invention.

DETAILED DESCRIPTION OF A PREFERRED EMBODIMENT

The switching network labelled KF1 is a switching network having a multistage reversed trunking arrangement and switching on a four wire basis for a maximum number of single channel subscriber lines AL111 . . . AL*gve* which number is a product of the numbers *e* . *v* . *g*. The subscriber lines are connected to a first switching stage and are divided by the switching network trunking into a number *g* groups of a number *v* subgroups of a number *e* terminals each. The first switching stage A is provided with a conductor crossing for error-free switching and is connected to a second switching stage B over a number which is the product of *z* . *v* . *g* connection channels.

The switching network KF1 is constructed as a PCM time division switching network in which the first switching stage A is formed by a number of termination coupling circuits AS corresponding to the number of audio frequency subscriber lines AL connected to the switching network KF1. The termination coupling circuits AS are each individually allocated to a subscriber line AL and have a PCM Codec audio frequency to PCM, analog-digital converter with a PCM word register Z and a time slot switch ZS shown in the drawing for the termination coupling circuit AS111.

The termination coupling circuits AS are divided into a number *g* groups of termination coupling circuits AS111 . . . AS1*ve*; . . . ; AS*g*11 . . . AS*gve*, each comprising a number *v* subgroups AS111 . . . AS11*e*, . . . , AS1*v*1 . . . AS1*ve*; . . . ; AS*g*11 . . . AS*g*1*e*, . . . , AS*gv*1 . . . AS*gve* of a number *e* termination coupling circuits, each individually allocated to a subscriber line AS111 . . . AS*gve*.

As shown in the drawing for the termination coupling circuit AS111, the time slot switch ZS is constructed as an intermediate switch so as to enable a conductor crossing for error-free switching. There is further shown in the drawing for termination coupling circuit AS111 that each termination coupling circuit may have what is known as a holding set HS in the form of a conventional circulating storage with following decoder, from which the PCM word register Z associated with the PCM Codec AF/PCM, and the time slot switch ZS can be driven at the proper time in accordance with the time position allotted to the connection concerned. The PCM Codec AF/PCM may be designed in a manner in itself known. By way of example, a PCM Codec is shown in commonly assigned U.S. Pat. No. 3,993,992 corresponding to West German Offenlegungsschrift No. 2,333,298, as well as IBM Technical Disclosure Bulletin, Volume 10, No. 9, Feb. 1968, pp. 1372–1373.

The termination coupling circuits forming a subgroup are each connected to a TDM trunk having a number *z* time slots assigned to that subgroup. Thus, for example, in the PCM time division multiplex switching network KF1 shown in the drawing the termination coupling circuits AS111 . . . AS113 are connected to TDM trunk L*ab*11 and the termination coupling circuits AS1*v*1 . . . AS1*ve* are connected to the TDM trunk L*ab*1*v*, termination coupling circuits AS*g*11 . . . AS*g*13 are connected to TDM trunk L*abg*1, and termination coupling circuits AS*gv*1 . . . AS*gve* are connected to TDM trunk Labgv. In the case of *z* . *v* . *g* connection channels running between the first switching stage A and the second switching stage BV . g TDM trunks L*ab*11 . . . L*abgv* are each seized by a time slot frame of *z* time slots. For example, in the case of 1024 connections between the first and second switching stages, *g*=8 groups of single channel subscriber lines AL (of *v*=8 subgroups of *e*=12 terminals each) connectible to the first switching stage A, the individual TDM trunks can each be seized by a time slot frame of *z* = 16 time slots.

Each of the TDM trunks L*ab*11 . . . L*abgv* leads to an input of a TDM switching matrix of the second switching stage B associated with the relevant group of termination coupling circuits AS111 . . . AS*gve*. Thus, in the PCM time division multiplex switching network KF1 illustrated in the drawing the TDM trunks L*ab*11 . . . L*ab*1*v* are each connected to an input of a TDM switching matrix B1 associated with the group termination coupling circuits AS111 . . . AS1*ve*, while the TDM trunks L*abg*1 . . . L*abgv* are each connected to an input of a TDM switching matrix Bg of the second switching stage B associated with the group of subscriber lines AL*g*11 . . . As*gve*. The *g* TDM switching matrices B1 . . . B*g* accordingly have *v* inputs and *g* outputs each. In the drawing it is indicated for TDM switching matrix B1 that there are provided at the intersections of the incoming and outgoing circuits of the TDM switching matrix pairs of crosspoint switches which can be driven to the time positions allotted to the respective connections again by means of a holding set HS.

The PCM/TDM switching network KF1 depicted in the drawing has a third switching stage C with *g* TDM switching matrices C1 . . . C*g* with *g* inputs each. These *g* inputs are each connected to an output of each of the *g* TDM switching matrices B1 . . . B*g* of the second switching stage B by TDM trunks L*bc*11 . . . L*bc*1*g* . . . L*bcg*1 . . . L*bcgg*.

The construction and operation of TDM switching matrices like those contemplated for use herein are well known, as are their operating relationships with the other components forming a centrally controlled telecommunication switching system like the one disclosed herein. TDM switching matrices of the type here in question, as well as their operating relationships are described in greater detail in U.S. Pat. No. 3,280,262 (FIGS. 1 and 2*b*), U.S. Pat. No. 3,280,263 (FIGS. 1 and 2*b*) or U.S. Pat. No. 3,395,254 (FIG. 5).

A maximum of *g* . *v* . *e* single channel subscriber lines AL can be routed to the PCM/TDM switching matrix KF1 shown in the drawing. A larger number of subscriber lines can be considered because, as shown in the drawing, the switching network KF1 is part of a switching network comprising several such switching networks KF1 . . . KF*k*. In the switching network the individual outputs of each TDM switching matrix C1 . . . C*g* of the third switching stage C of a switching network (KF1) are each connected to an output of the corresponding TDM switching matrix of the third switching stage of the remaining individual switching networks KF2 . . . KF*k*.

The connecting paths in the PCM/TDM switching network KF1 shown in the drawing proceed in the manner disclosed in the prior art for switching networks with a reversed trunking arrangement. Subscriber lines which (as subscriber lines AS111 and **AL11*e*) are connected by their termination coupling circuit (AS111 or AS11*e*) to one and the same TDM link (L*ab*11), i.e., which are associated with one and the same subgroup of subscriber lines, are interconnected by that TDM link (Lab11) on a "short path" running only within the first switching stage A. Subscriber lines which (as subscriber lines Alg11 and AL*gve*) are associated with one and the same group, but not with one and the same subgroup, of subscriber lines are interconnected by the TDM links (L*abg*1 and L*abgv*)** connected to the respective subgroups and over the TDM switching matrix (B*g*) of the second switching stage B associated with the group of subscriber lines concerned. Connections between two subscriber lines which (as subscriber lines **AL1*ve* and AL*g*11) are not assoicated with one and the same group of subscriber lines use the associated TDM trunk (L*ab*1*v* or L*abg*1)** to the associated TDM switching matrix (B1 or B*g*) of the second switching stage B and from there proceed further to one of the TDM switching matrices of the third switching stage C, e.g., over the TDM trunks L*bc*1*g* and L*bcgg* to the TDM switching matrix C*g*, where the last mentioned TDM trunks are periodically interconnected by a link in the time position allocated to the connection concerned. Connections between subscriber lines of various switching networks go first to a TDM switching matrix of the third switching stage C and from there further in the corresponding TDM switching matrix of the other switching network concerned.

It should be noted that if a single channel subscriber line supplies PCM signals, in departure from the conditions indicated in the drawing, the PCM Codec in the associated termination coupling circuit can be deleted. In this case, when routing a PCM/TDM trunk to the PCM/TDM switching network only a multiplexer/-demultiplexer must be provided, the individual inputs-/outputs of which are conveniently connected to termination coupling circuits of various terminal groups of the switching network.

The principles of the invention are described by describing the construction and operation of a preferred embodiment constructed accordingly. It is contemplated that the described embodiment can be modified or changed in a variety of ways without departing from the scope of the invention as defined by the appended claims.

I claim:

1. A telecommunication switching network having a multistage, reversed trunking arrangement and switching on a four wire basis, said switching network being constructed to operate as a pulse code modulation (PCM) time division multiplex (TDM) network, comprising:

a number $e \,.\, v \,.\, g\,.$ of single channel subscriber lines connected to a first switching stage of said network wherein said subscriber lines are divided into a number $g$ groups, each group containing a number $v$ subgroups and each subgroup containing a number $e$ terminals, a number $e$ of termination coupling circuit means in each said subgroup in said first switching stage for supplying information on said subscriber lines in PCM/TDM form, each said termination coupling circuit means having an input individually conncted to a said subscriber line, a number of $g.v$ of TDM trunks, said trunks being individually connected to outputs of the said termination coupling circuit means in differing ones of said subgroups, each said trunk being constructed to carry a number $z$ of time slots thereby forming a number $z.v.g$ connection channels from said first to a second switching stage, a first number g of TDM switching matrices in a second stage, each switching matrix having $v$ inputs and $g$ outputs, each said switching matrix having inputs connected to those of said TDM trunks connected to the said termination circuit means in a given group and a second number $g$ of TDM switching matrices in a third stage having $g$ inputs, each of which is individually connected to an output from a said first TDM switching matrix, said third stage having outputs for connection to other switching networks.

2. The switching network defined in claim 1 wherein said subscriber lines carry audio frequency signals and wherein each said termination circuit means comprises:

means for converting said audio frequency signals to PCM signals, time slot switch means for coupling said PCM signals to the said TDM trunk connected thereto in the time slot assigned to that termination circuit means and register means for storing said PCM signals until the occurrence of the assigned time slot.

3. The switching network defined in claim 1 wherein said subscriber lines carry PCM signals and wherein each said termination circuit means comprises:

time slot switch means for coupling said PCM signals to the said TDM trunk connected thereto in the time slot assigned to that termination circuit means and register means for storing said PCM signals until the occurrence of the assigned time slot.

* * * * *